US009419454B2

(12) United States Patent
Pickens et al.

(10) Patent No.: US 9,419,454 B2
(45) Date of Patent: *Aug. 16, 2016

(54) BATTERY PACK-TO-UNIVERSAL SERIAL BUS POWER DEVICES

(71) Applicant: Custom LeatherCraft Manufacturing Co., Inc., South Gate, CA (US)

(72) Inventors: Ron A. Pickens, Owasso, OK (US); Matthew D. Noble, Los Angeles, CA (US)

(73) Assignee: Custom LeatherCraft Manuf. Co., Inc., South Gate, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/485,755

(22) Filed: Sep. 14, 2014

(65) Prior Publication Data
US 2015/0084592 A1    Mar. 26, 2015

Related U.S. Application Data

(60) Provisional application No. 61/882,053, filed on Sep. 25, 2013.

(51) Int. Cl.
*H01M 10/46* (2006.01)
*H02J 7/00* (2006.01)

(52) U.S. Cl.
CPC ....... *H02J 7/0045* (2013.01); *H02J 2007/0062* (2013.01)

(58) Field of Classification Search
CPC .............................. H02J 7/355; H02J 7/0042
USPC .......... 320/107, 111, 114, 115; 150/100, 118, 150/131, 143
See application file for complete search history.

(56) References Cited

U.S. PATENT DOCUMENTS

| | | | | |
|---|---|---|---|---|
| 2012/0262117 A1* | 10/2012 | Ferber | ................... | H02J 7/0047 320/111 |
| 2015/0084578 A1* | 3/2015 | Pickens | ................. | H02J 7/0054 320/103 |
| 2015/0084596 A1* | 3/2015 | Pickens | ................... | A45F 5/021 320/127 |
| 2015/0318716 A1* | 11/2015 | Pickens | ................. | H02J 7/0003 320/110 |

* cited by examiner

*Primary Examiner* — Edward Tso

(57) ABSTRACT

A device includes a battery pack receptacle that removably connects to a battery pack used for a cordless device. A universal serial bus (USB) port is connected to the battery pack receptacle. The battery pack is used as a power source for the USB port. An attachment device is connected to the battery pack receptacle. that attaches the battery pack receptacle to a utility bag. The attachment device is configured for attaching the battery pack receptacle to a platform.

20 Claims, 10 Drawing Sheets

BATTERY PACK-TO-UNIVERSAL SERIAL BUS POWER DEVICES

CROSS-REFERENCE TO RELATED APPLICATIONS

This application claims the priority benefit of U.S. Provisional Patent Application Ser. No. 61/882,053, filed Sep. 25, 2013, incorporated herein by reference in its entirety.

TECHNICAL FIELD

One or more embodiments relate generally to universal serial bus (USB) power, and in particular, use of a tool battery pack as a power source for USB devices using an receptacle/adapter.

BACKGROUND

Portable cordless power tools typically include replaceable and removable battery packs. The battery packs may have different voltages, such as 12V, 18V, 24V, etc. The cordless power tools (e.g., a cordless drill, cordless screwdriver, etc.) may be packaged with a spare battery pack that may be charged in a charger while the other battery pack is in use.

SUMMARY

One embodiment includes a battery pack receptacle that removably connects to a battery pack used for a cordless device. A universal serial bus (USB) port is connected to the battery pack receptacle. The battery pack is used as a power source for the USB port. An attachment device is connected to the battery pack receptacle. that attaches the battery pack receptacle to a utility bag. The attachment device is configured for attaching the battery pack receptacle to a platform.

Another embodiment comprises an apparatus that includes a battery pack receptacle that removably receives a battery pack used for a cordless device. An attachment device is coupled to the battery pack receptacle and is configured for attaching the battery pack receptacle to a platform. One or more universal serial bus (USB) connectors are coupled to the battery pack receptacle.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

Figure 1:
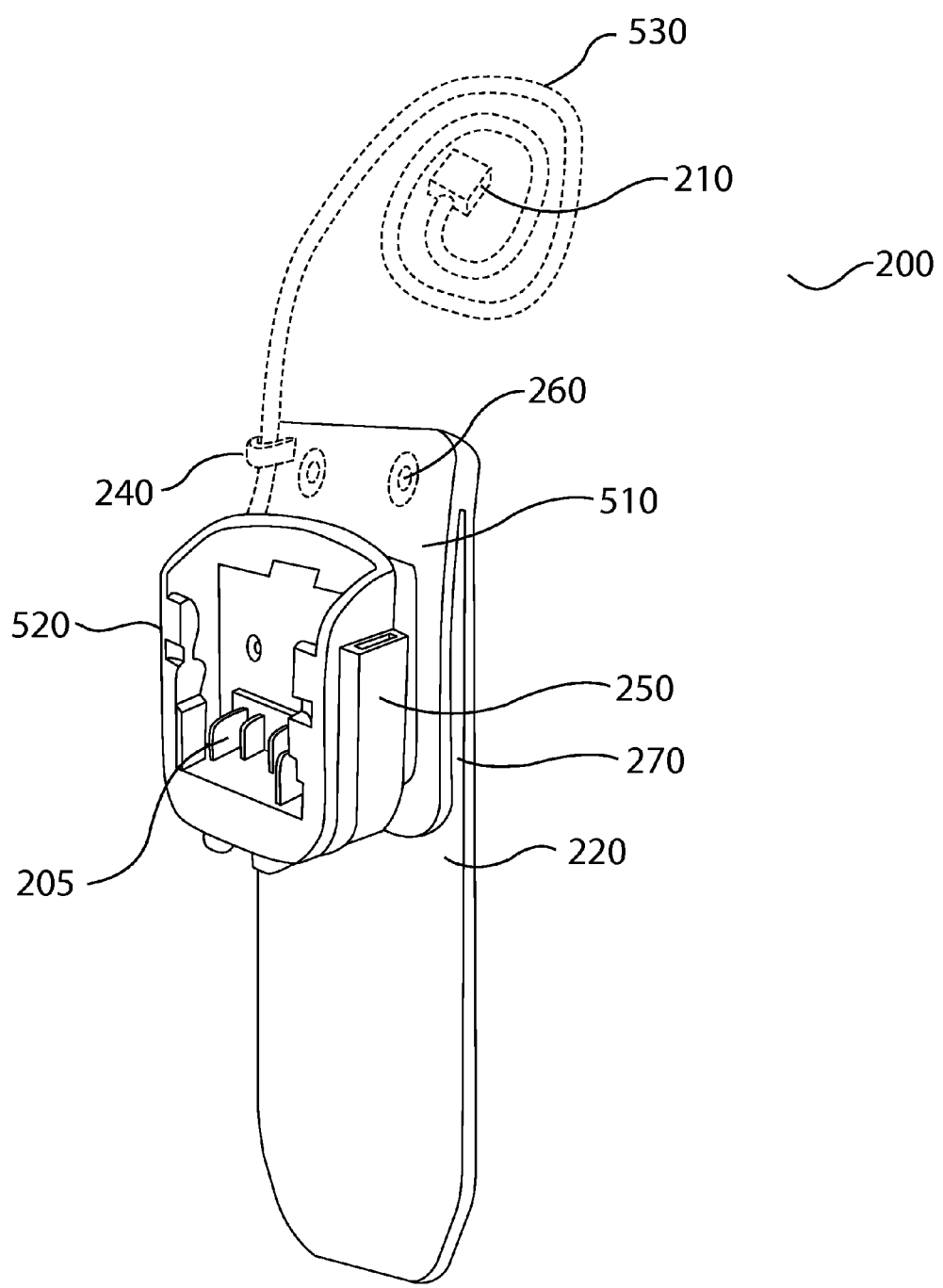
FIG. 1 illustrates a perspective view of a receptacle/adapter for a battery pack bag according to one embodiment.

The following description is made for the purpose of illustrating the general principles of the one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments for battery pack receptacles for transferring power from a cordless device battery pack to a USB receptacle that may be used and attached to various devices/platforms, for example a utility bag, backpack, travel bag, sports bag, cooler, a belt, suspenders, a tool box, a ladder, a shelf, a work bench/table, a pocket, etc., as well as operation and/or component parts thereof. While the following description will be described in terms of cordless device battery pack power for USB devices, for clarity and to place the one or more embodiments in context, it should be kept in mind that the teachings herein may have broad application to all types of systems, devices and applications.

The description may disclose several preferred embodiments of battery pack to USB connections for powering/charging electronic devices, as well as operation and/or component parts thereof. While the following description will be described in terms of battery pack to USB connections for powering/charging electronic devices and systems for clarity and to place the invention in context, it should be kept in mind that the teachings herein may have broad application to all types of systems, devices and applications One or more embodiments relate to cordless device battery pack power used for USB devices. In one embodiment, an apparatus includes a battery pack receptacle that removably connects to a battery pack used for a cordless device. A USB port is connected to the battery pack receptacle. The battery pack is used as a power source for the USB port. An attachment device is connected to the battery pack receptacle. that attaches the battery pack receptacle to a utility bag. The attachment device is configured for attaching the battery pack receptacle to a platform. Another embodiment comprises an apparatus that includes a battery pack receptacle that removably receives a battery pack used for a cordless device. An attachment device is coupled to the battery pack receptacle and is configured for attaching the battery pack receptacle to a platform. One or more (e.g., 1, 2, 3, etc.) USB connectors are coupled to the battery pack receptacle.

One embodiment of the invention includes charging/powering an electronic device that may be employed in multiple housings, such as utility bags, fishing bags, backpacks, duffel bags, tool boxes, tool carriers, sports bags, luggage, emergency services bags, cases, coolers, etc. It should be noted that while utility bags are shown and discussed for housing the embodiments, other housings may also be implemented (e.g., pocket books, fanny packs, stand-alone containers or devices, bucket bags, etc. In other embodiments, no housing is required and the battery pack receptacle and USB receptacle or port may be integrated into a single component or housing without a utility bag or other container (e.g., integrated into a carrying case, an electronic device (e.g., radio or digital music playing device, storage case, etc.

FIG. 1 illustrates a perspective view 200 of a receptacle/adapter 520 for a battery pack (e.g., a cordless device battery pack, such as a cordless drill, etc.) according to one embodiment. In one embodiment, the receptacle/adapter 520 includes a USB connection port 250. In one embodiment, the receptacle/adapter 520 includes a USB cord 530 having a length and including a USB port 210 at the end (e.g., male or female). In one embodiment, the length of the USB cord 530 may comprise any desirable length and may be based on implementation (e.g., 6 in.-6 ft., etc.). In one embodiment, the receptacle/adapter 520 may have more than one USB connection ports 250 that are integrated with the receptacle/adapter 520. In one embodiment, the receptacle/adapter may include a cord winding portion to wind the cord 530. In some embodiments, the cord 530 is optional and may or may not be included with the receptacle/adapter 520. In one embodiment, the cord 530 is removably or permanently coupled to the receptacle/adapter 520.

In one embodiment, the receptacle/adapter 520 may include attachment portions 260 for either permanently or removably attaching the receptacle/adapter to a utility bag or other device. In one embodiment, the receptacle/adapter 520 may include a channel or cut-out portion for passing the cord 530. In one embodiment, the receptacle/adapter 520 includes a front coupling portion 510 and a rear coupling portion 220. In one embodiment, a gap 270 between the front coupling portion 510 and the rear coupling portion 220 may be fitted over non-rigid or semi-rigid material of a pocket of a utility bag or other device, placed over a rigid material of a device for placement of the receptacle/adapter 520. In one embodiment, the USB cord 530 may be fitted into a conduit, tunnel, groove, etc. of utility bags, bags, cases, boxes, coolers, clothing, etc. In one embodiment, the rear coupling portion 220 has a length greater than the front coupling portion 510.

In one embodiment, the receptacle/adapter 520 may be positioned in a pocket, clipped to a pocket, part of a pocket, positioned inside a utility bag, part of a wall of a utility bag (e.g., a side-wall, an end-wall, etc.), container, case, box, cooler, etc. as desired. In one embodiment, the receptacle/adapter includes battery terminal connectors 205 that couple with terminals of a battery to transfer the voltage or power to the receptacle/adapter 520 to power the USB connection port 250 and/or the USB cord 530 and USB port 210 (and any other optional USB ports). In one embodiment, the receptacle/adapter 520 includes a USB cord guide element 240 (e.g., a loop, open loop, removable portion of a loop, etc.) that may be placed around or over the USB cord 530 for maintaining the USB cord 530 in a desired position.

Figure 2:
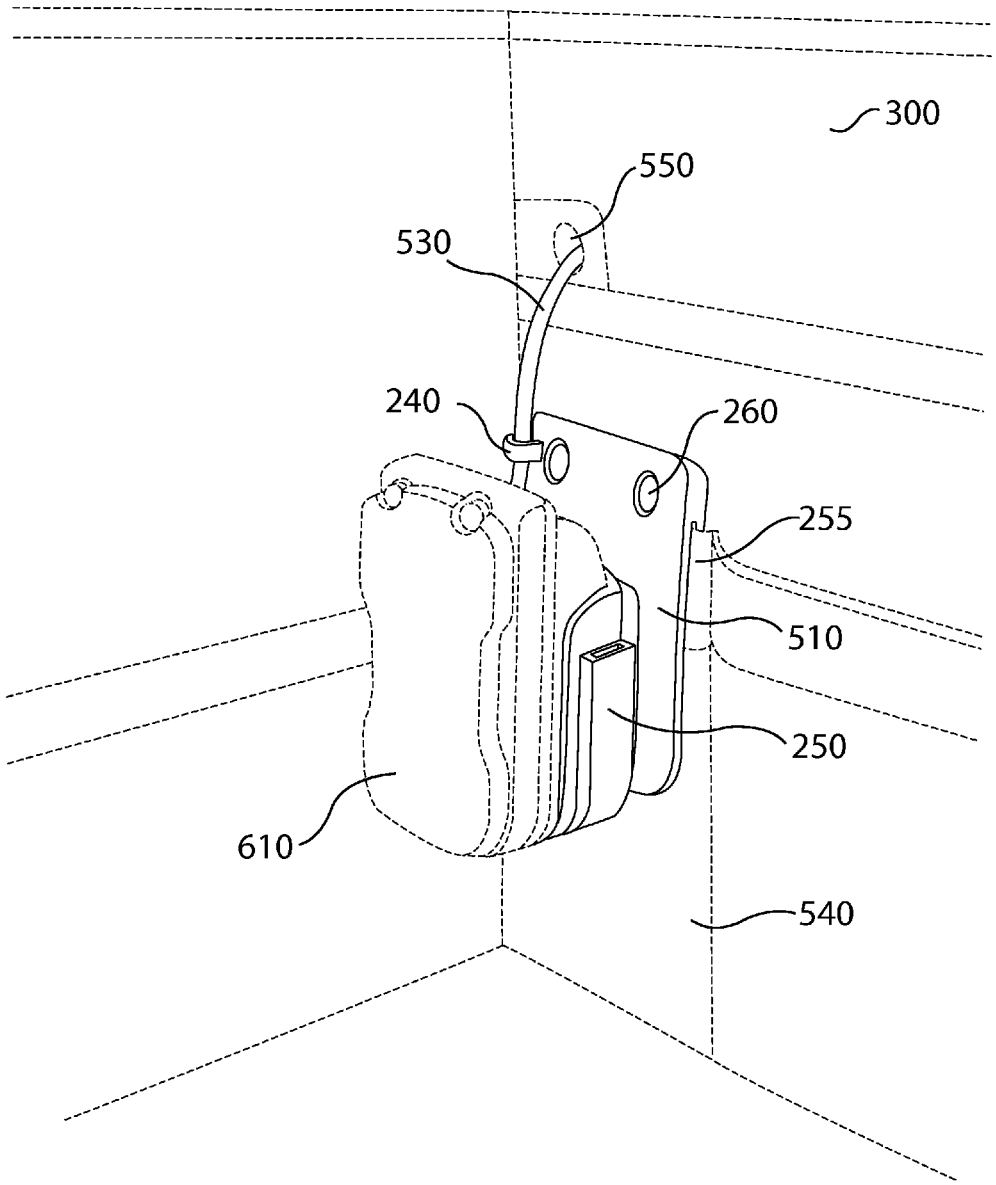
FIG. 2 illustrates a perspective view of a receptacle/adapter for a battery pack shown in FIG. 1 and showing an example implementation with an inserted example battery pack and an example utility bag according to one embodiment.

FIG. 2 illustrates a perspective view 300 of the receptacle/adapter 520 for a battery pack as illustrated in FIG. 1 and showing an example implementation with a utility bag 540 (or other device) according to one embodiment. In one embodiment, the battery pack 610 is slid or placed into the receptacle/adapter 520 and connects with the battery terminal connectors 205 for powering the USB connection port 250 and the optional USB cord 530. In one embodiment, the cord 530 is disposed within a through-hole 550 and into a conduit or channel of the utility bag 540 (or other device). In one embodiment, the front coupling portion 510 fits over material 255 of the utility bag 540 (or other device) and the rear coupling portion 220 fits within or behind the material 255 for holding the receptacle/adapter 520 in place.

Figure 3:
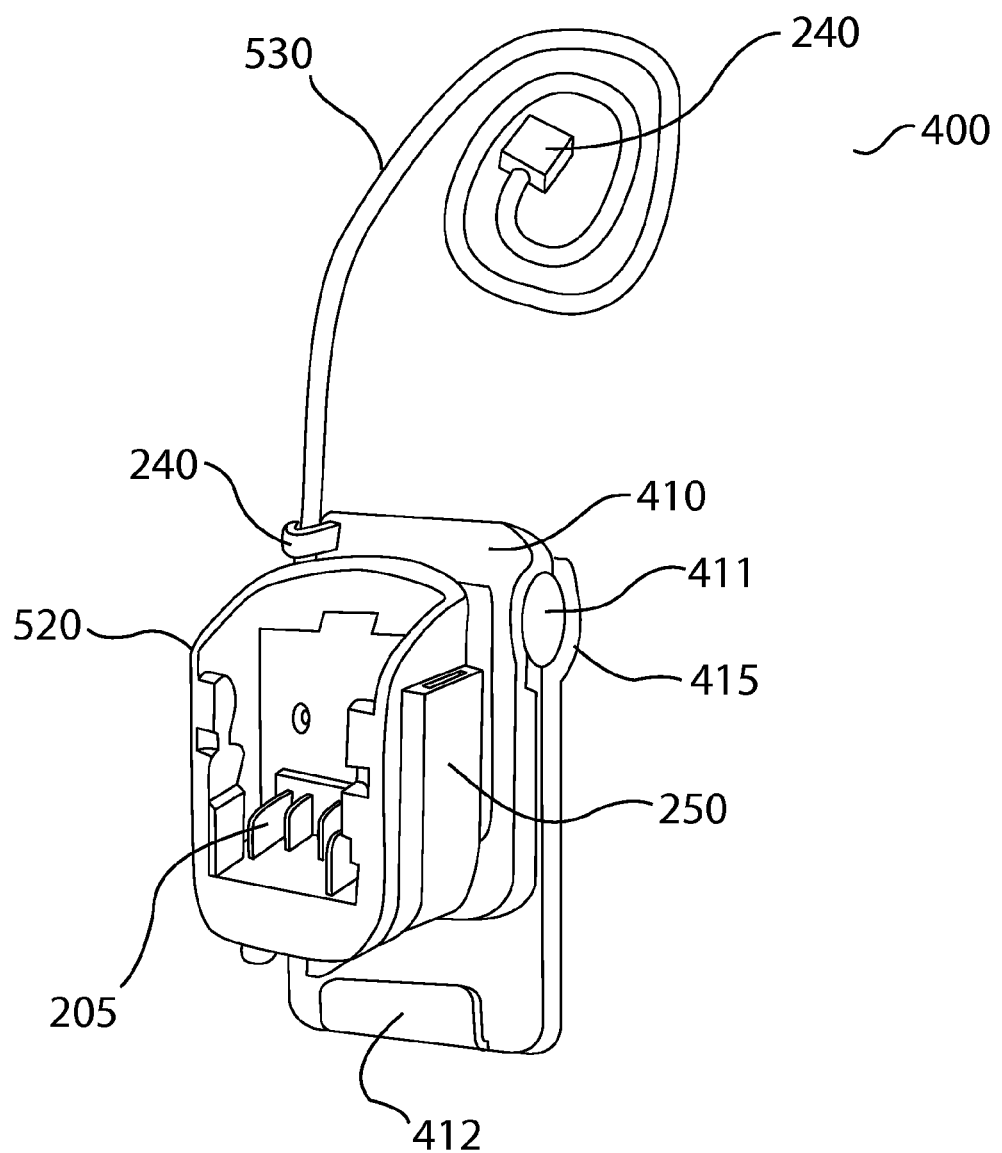
FIG. 3 illustrates a perspective view of another receptacle/adapter for a battery pack according to one embodiment.

FIG. 3 illustrates a perspective view 400 of another receptacle/adapter 520 for a battery pack according to one embodiment. In one embodiment, the receptacle/adapter 520 includes a front coupling portion 410, a rear coupling portion 415, a rotational element 411, and a retaining portion 412. In one embodiment, retaining portion 412 is configured for coupling material of a utility bag (or other device) behind the retaining portion 412, which creates a locking or fastening of the rear coupling portion 415 and prevents removal unless the rear coupling portion 415 is forced downward to release the material from the retaining portion 412.

In one embodiment, a battery pack slides or clips into place on the receptacle/adapter 520. In one embodiment, the front coupling portion 410, rotational element 411 and the rear coupling portion 415 form a spring clip type of device that may be pinched or grasped at the top to force the lower portion of the front coupling portion 410 and the lower portion of the rear coupling portion 415 apart, and released to force the lower portion of the front coupling portion 410 and the lower portion of the rear coupling portion 415 towards one another to clip to material.

Figure 4:
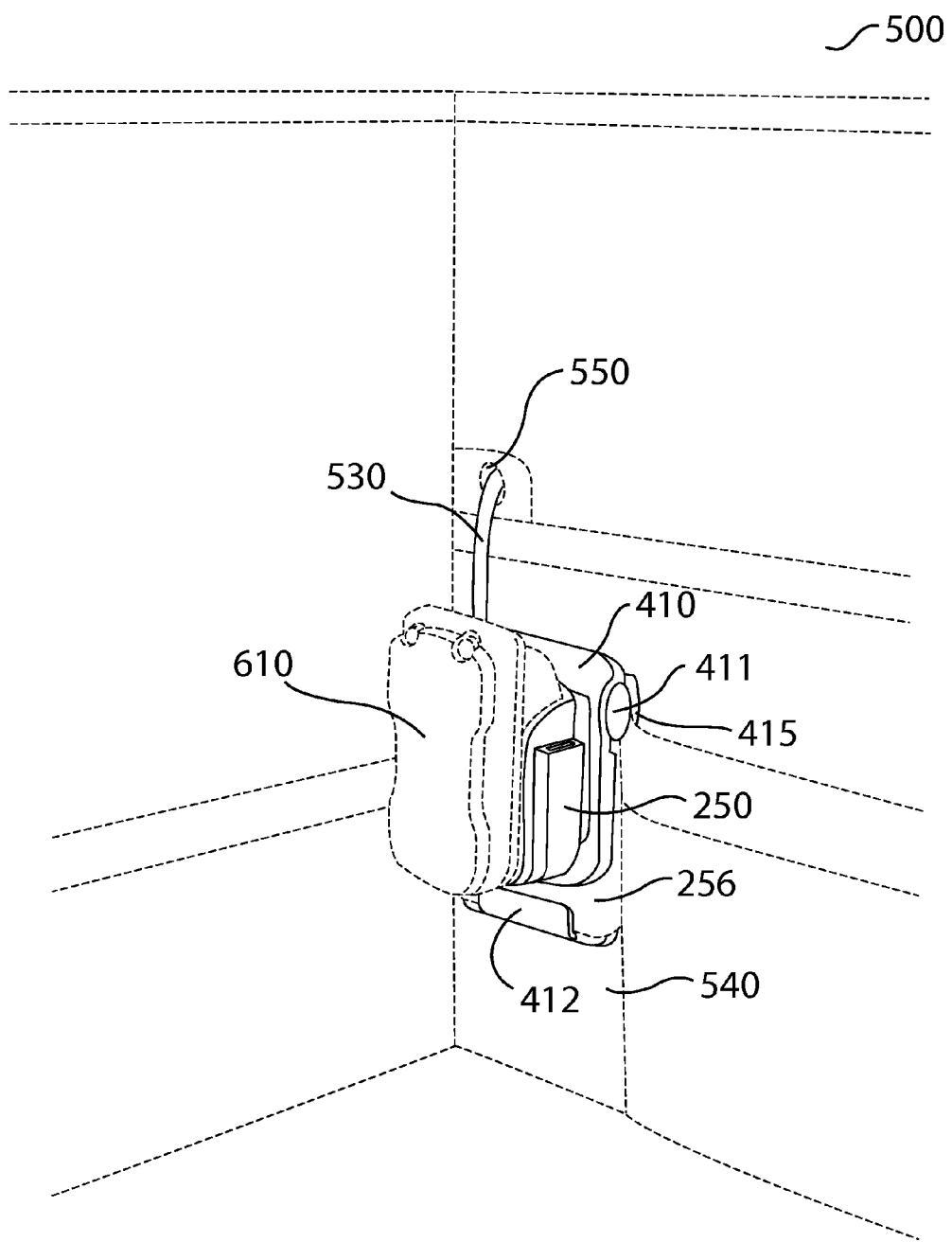
FIG. 4 illustrates a perspective view of the receptacle/adapter for a battery pack shown in FIG. 3 showing an example implementation with a utility bag according to one embodiment.

FIG. 4 illustrates a perspective view 500 of the receptacle/adapter 520 shown in FIG. 3 for an example battery pack 610 showing an example implementation with a utility bag 540 (or other device) according to one embodiment. In one embodiment, retaining portion 413 has material 256 of a utility bag 540 (or other device) fit within the material 256 when inserted, which creates a locking or fastening of the rear coupling portion 415 and prevents removal unless the front coupling portion 410 and rear coupling portion 415 are forced downward to release the material 256 from the retaining portion 412. In one embodiment, the material 256 overlaps a portion of the utility bag 540 (or other device). In one embodiment, the receptacle/adapter 520 is removably coupled to the material 256. In one embodiment, a battery pack 610 slides or clips into place on the receptacle/adapter 520 in a downward direction. In one embodiment, the front coupling portion 410, rotational element 411 and the rear coupling portion 415 form a spring clip type of device that may be pinched or grasped at the top to force the lower portion of the front coupling portion 410 and the lower portion of the rear coupling portion 415 apart, and released to force the lower portion of the front coupling portion 410 and the lower portion of the rear coupling portion 415 towards one another to clip to material, such as material 256.

In another example embodiment, the receptacle/adapter 520 may be permanently attached to a utility bag 540 (or other device or platform), for example, using rivets, nuts and bolts, heat welding, epoxy welding, snap fit components, etc. In another example embodiment, the receptacle/adapter 520 may be mounted to material 256 internally or externally to the utility bag 540 (or other device).

In one embodiment, the cord 530 is disposed within a through-hole 550 and into a conduit or channel of the utility bag 540 (or other device). In one embodiment, the front coupling portion 410 fits over material 256 of the utility bag 540 (or other device) and the rear coupling portion 415 fits within or behind the material 256 for holding the receptacle/adapter 520 in place.

Figure 5:
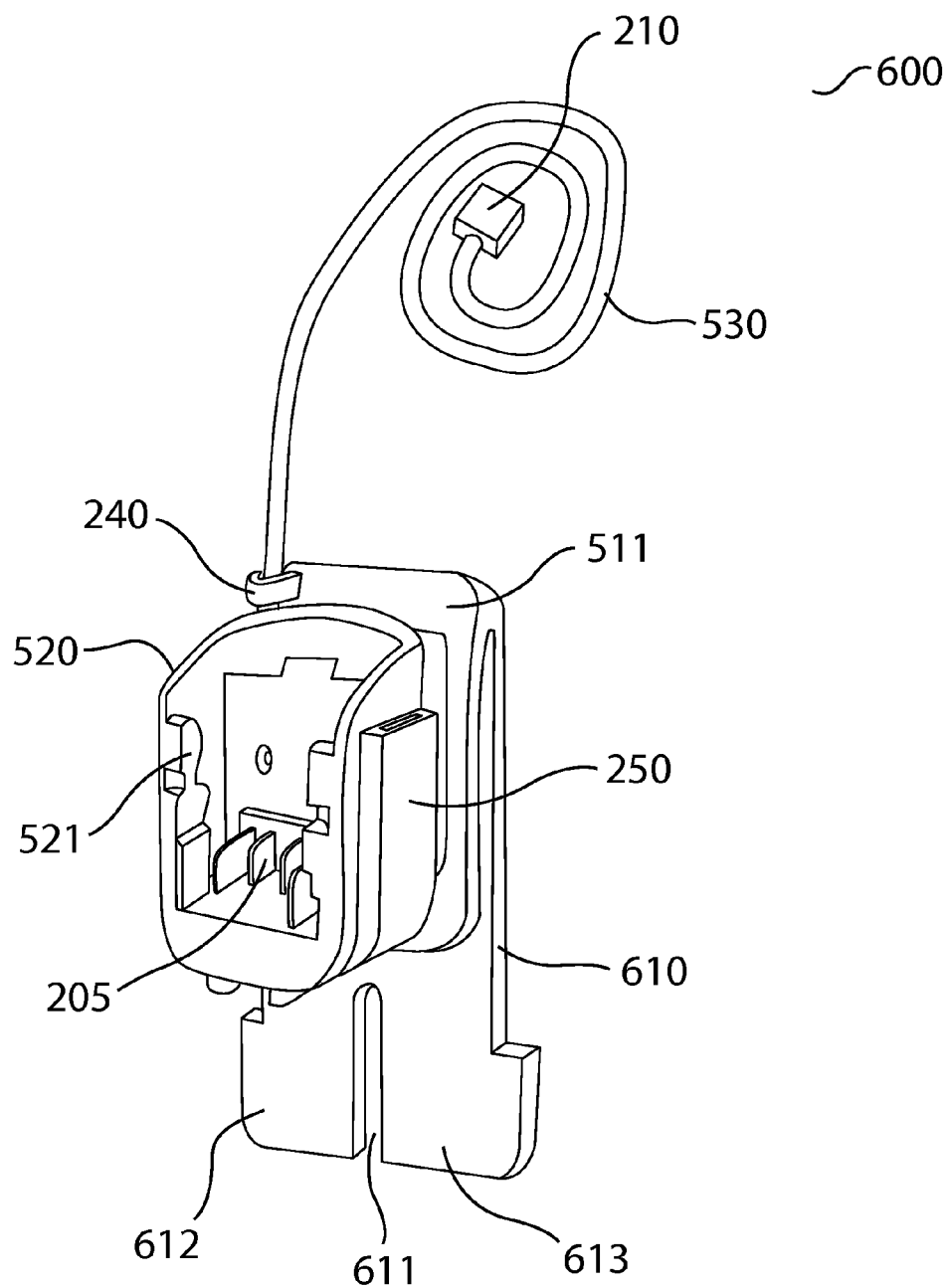
FIG. 5 illustrates a perspective view of still another receptacle/adapter for a battery pack according to one embodiment.

FIG. 5 illustrates a perspective view 600 of still another receptacle/adapter 520 for a battery pack according to one embodiment. In one embodiment, the receptacle/adapter 520 includes a front coupling portion 511, a rear coupling portion 610, a first foot portion 613, and a second foot portion 612, where a gap or groove 611 is formed between the first foot portion 613 and the second foot portion 612. In one embodiment, the foot portions 612 and 613 may be forced towards one another (each towards the gap 611). In one embodiment, a battery pack slides or clips into place on the receptacle/adapter 520 behind or with the battery retaining portion 521. In one embodiment, the battery retaining portion 521 may be configured for one or more specific manufacturer's type of battery. In other embodiments, the retaining portion 521 may be designed to retain multiple types of manufacturer specific designed batteries.

Figure 6:
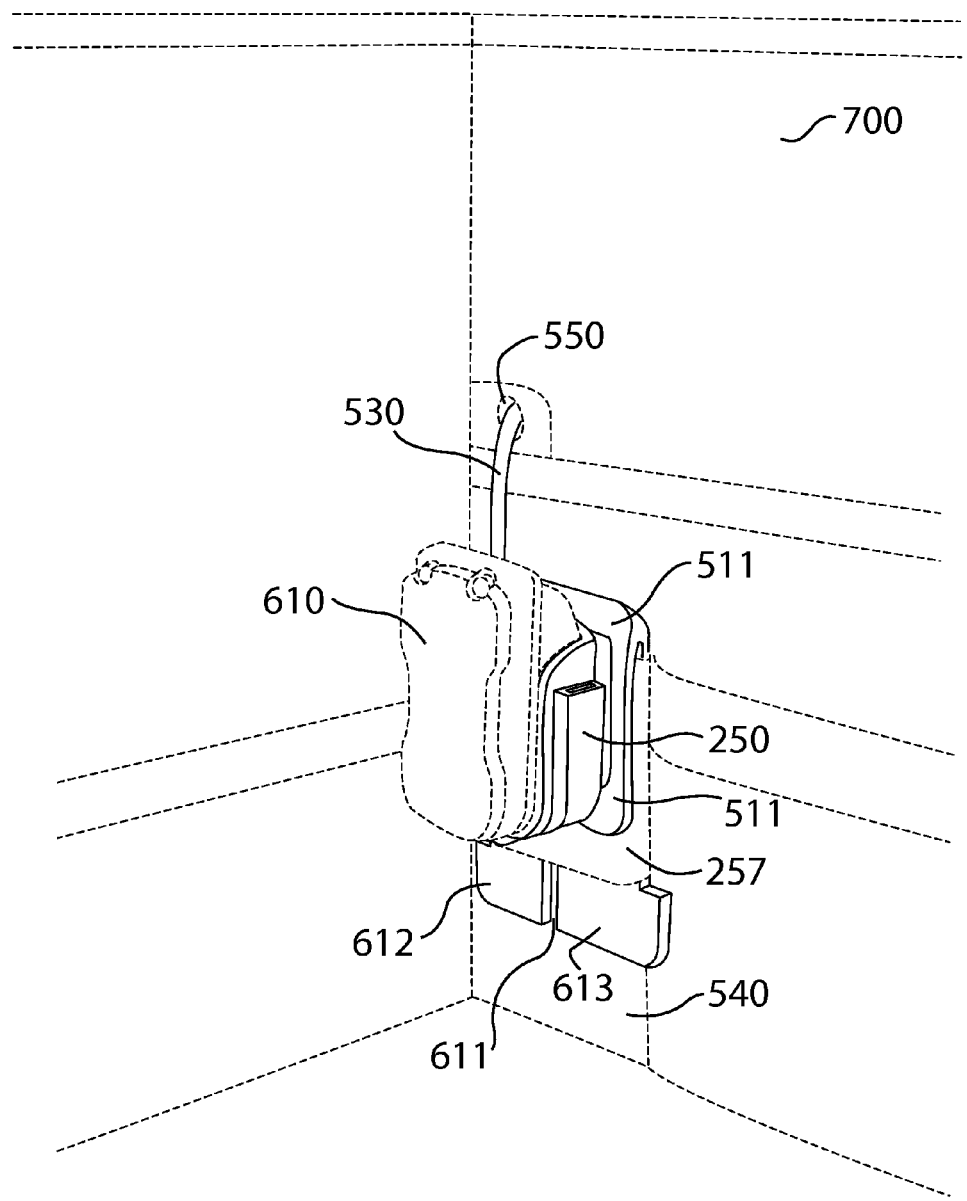
FIG. 6 illustrates a perspective view of the receptacle/adapter for a battery pack shown in FIG. 5 and showing an example implementation with a utility bag according to one embodiment.

FIG. 6 illustrates a perspective view 700 of the receptacle/adapter 520 for a battery pack as illustrated in FIG. 5 and showing an example implementation with a utility bag 540 (or other device) according to one embodiment. In one embodiment, the foot portions 612 and 613 may be forced towards one another (each towards the gap 611) such that the width of the lower rear coupling portion 610 fits within the material 257 when inserted and expands back after the forced is removed, which creates a locking or fastening of the foot portions 612 and 613 outside the width of the material 257 and prevents removal unless the foot portions 612 and 613 are forced towards each other and the receptacle/adapter 520 is forced out of the material 257 that overlaps a portion of the utility bag 540 (or other device). In one embodiment, the material 257 overlaps a portion of the utility bag 540 (or other device). In one embodiment, the receptacle/adapter 520 is removably coupled to the material 257. In one embodiment, a battery pack 610 slides or clips into place on the receptacle/adapter 520.

In another example embodiment, the receptacle/adapter 520 may be permanently attached to a utility bag 540 (or other device), for example, using rivets, nuts and bolts, heat welding, epoxy welding, etc. In another example embodiment, the receptacle/adapter 520 may be mounted to material 257 internally or externally to the utility bag 540 (or other device).

In one embodiment, the cord 530 is disposed within a through-hole 550 and into a conduit or channel of the utility bag 540 (or other device). In one embodiment, the front coupling portion 511 fits over material 257 of the utility bag 540 (or other device) and the rear coupling portion 610 fits within or behind the material 257 for holding the receptacle/adapter 520 in place.

Figure 7:
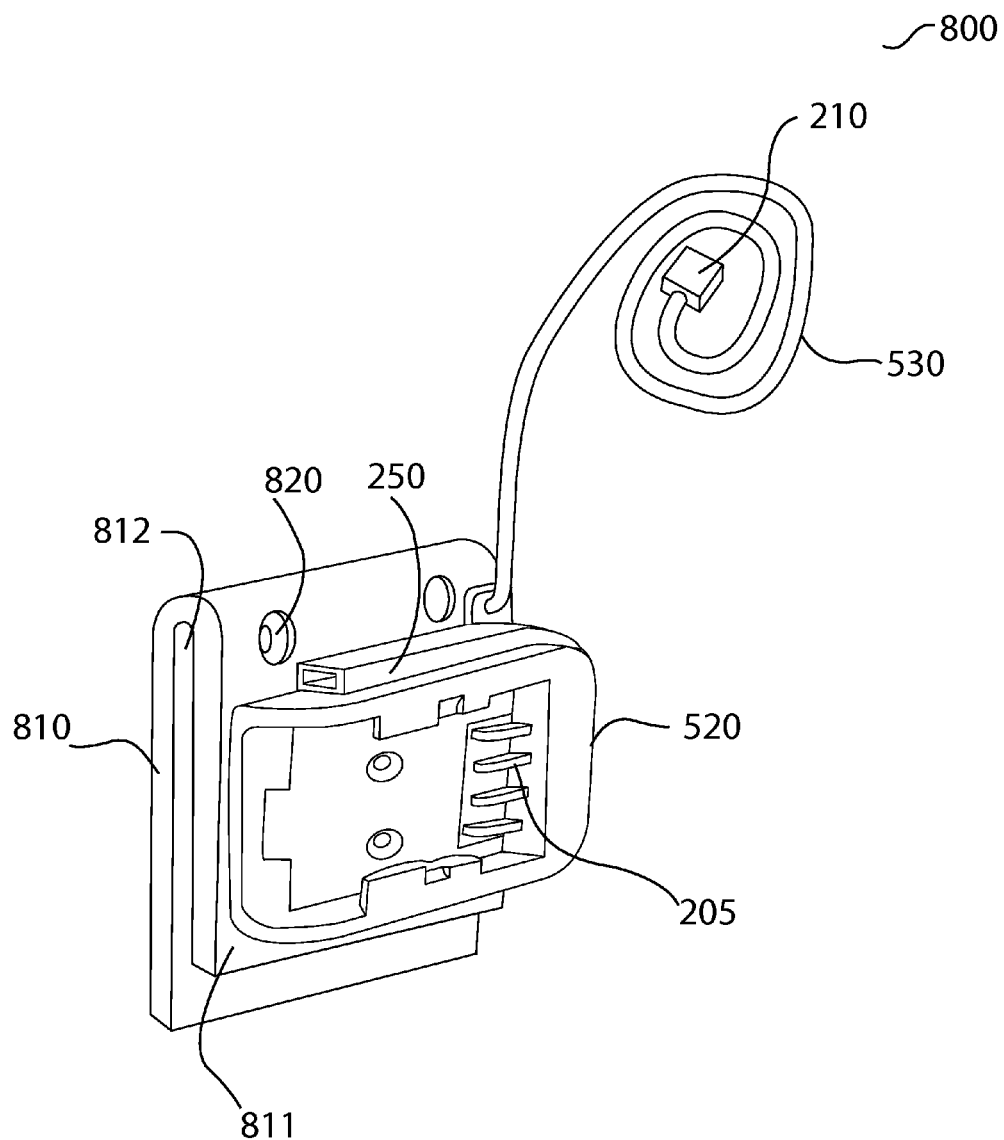
FIG. 7 illustrates a perspective view of another receptacle/adapter for a battery pack according to one embodiment.

FIG. 7 illustrates a perspective view 800 of yet another receptacle/adapter 520 for a battery pack according to one embodiment. In one embodiment, the receptacle/adapter 520 is positioned horizontally on a U-shaped attachment mounting element including a front coupling element 811 and a rear coupling element 810 with a gap 812 formed in-between. In one embodiment, the receptacle/adapter 520 is fixed to the front coupling element 811. In one embodiment, a battery pack slides or clips into place on the receptacle/adapter 520. In one embodiment, the receptacle/adapter 520 may be removably coupled to a utility bag or other device, or permanently positioned on the a utility bag or other device using the through-holes 820 and fastening (e.g., using known fastening means, such as rivets, bolts/screws, snaps, etc.). In one embodiment, the receptacle/adapter 520 may be fastened to a utility bag or other device using hook and loop fasteners (e.g., on the back of the rear coupling device 810 and the item to be attached to.

Figure 8:
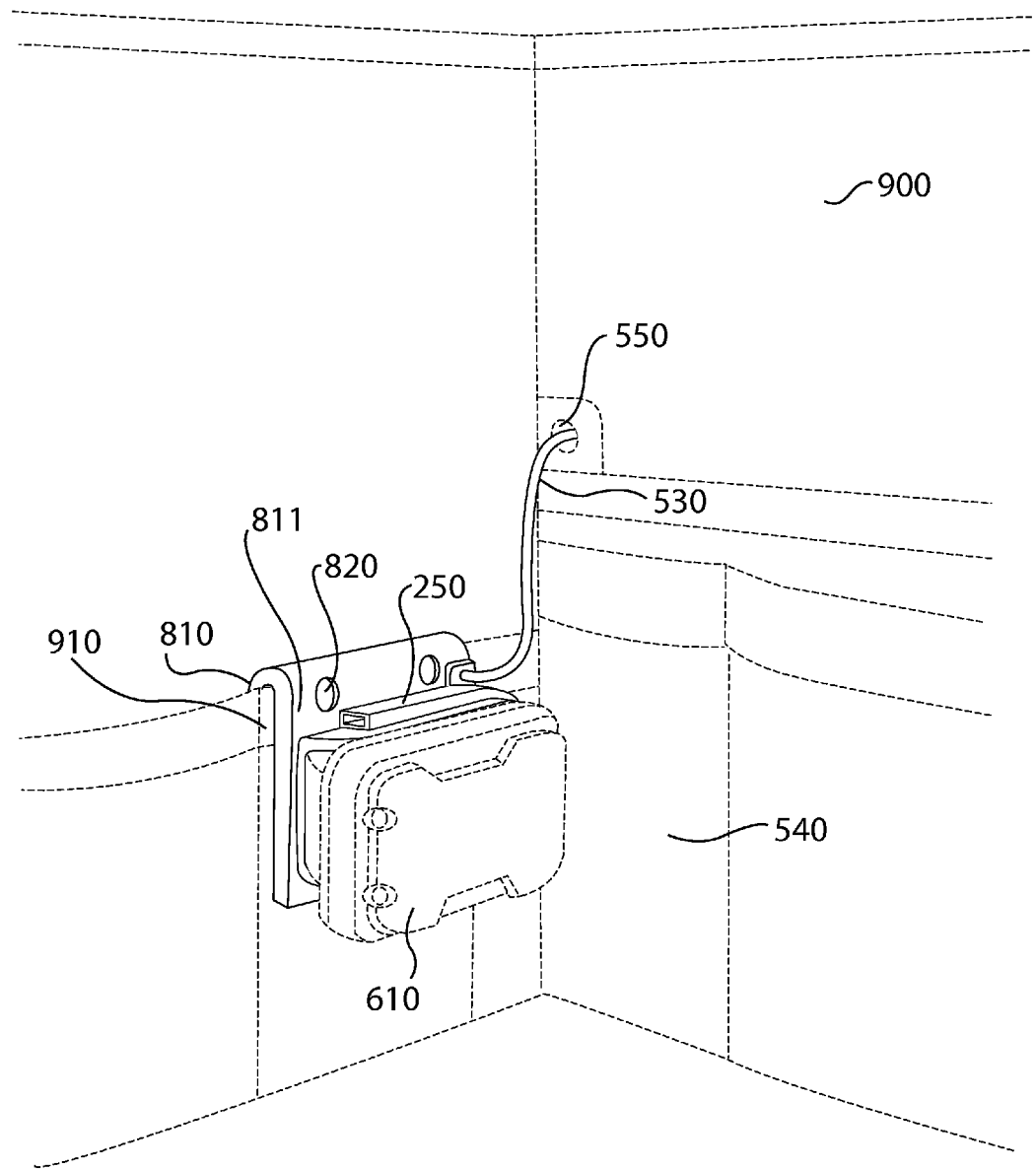
FIG. 8 illustrates a perspective view of the receptacle/adapter for a battery pack shown in FIG. 7 and showing an example implementation with a utility bag according to one embodiment.

FIG. 8 illustrates a perspective view 900 of the receptacle/adapter 520 for a battery pack 610 as illustrated in FIG. 7 and showing an example implementation with a utility bag 540 according to one embodiment. In one embodiment, the receptacle/adapter 520 may be mounted horizontally on a pocket 910 or material that provides for placement of the front coupling element 811 and the rear coupling element 810 over the pocket 910 or material. In one embodiment, a battery pack 610 slides or clips into place on the receptacle/adapter 520. In one embodiment, the receptacle/adapter 520 may be removably coupled to the pocket 910 or permanently positioned on the utility bag 540 (or other device) using the through-holes 820 and fastening (e.g., using known fastening means, such as rivets, bolts/screws, snaps, etc.). In one embodiment, the receptacle/adapter 520 may be fastened to the utility bag 540 (or other device) using hook and loop fasteners.

In one or more embodiments, the receptacle/adapter 520 embodiments are similar to a receptacle for charging battery packs used for cordless devices or tools (e.g., cordless drills, cordless screwdrivers, cordless saws, cordless garden tools, cordless sanders, etc. In one or more embodiments, the receptacle/adapter 520 includes metal connectors 205 that make contact with contacts of an inserted battery pack (e.g., battery pack 610) for passing electricity from the battery pack to the receptacle/adapter 520 and through the cord USB connector 250 and USB cord 530 (if included).

Figure 9:
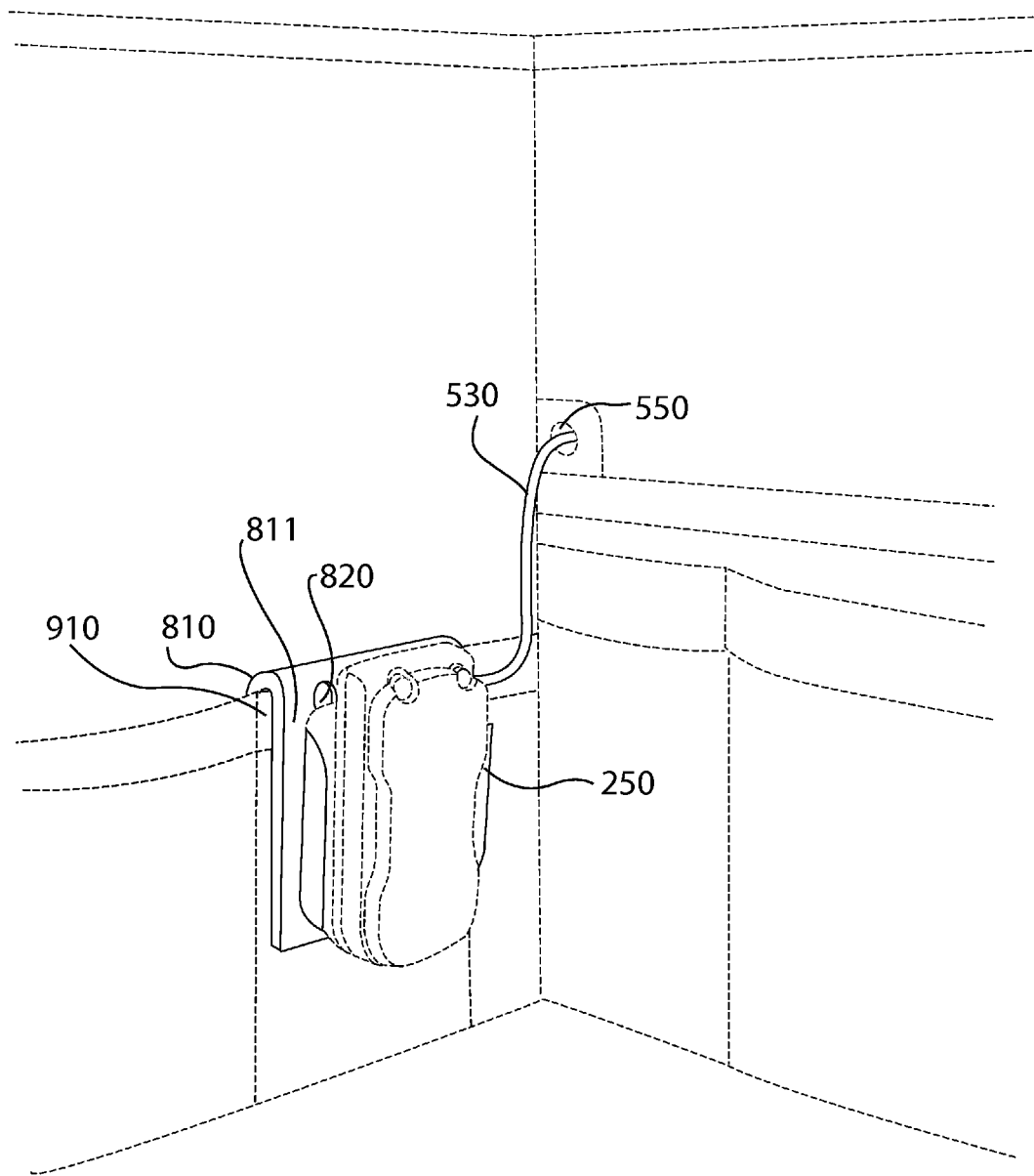
FIG. 9 illustrates a perspective view of the receptacle/adapter for a battery pack shown in FIG. 8 shown in another orientation and showing an example implementation with a utility bag according to one embodiment.

FIG. 9 illustrates a perspective view of the receptacle/adapter 520 for a battery pack 610 shown in FIG. 8 shown in another orientation (vertical) and showing an example implementation with a utility bag (e.g., utility bag 540) according to one embodiment. In one embodiment, the receptacle/adapter 520 is rotatable between horizontal and vertical orientations on the front coupling element 811. In other embodiments, the receptacle/adapter 520 may be fixed in a vertical orientation.

Figure 10:
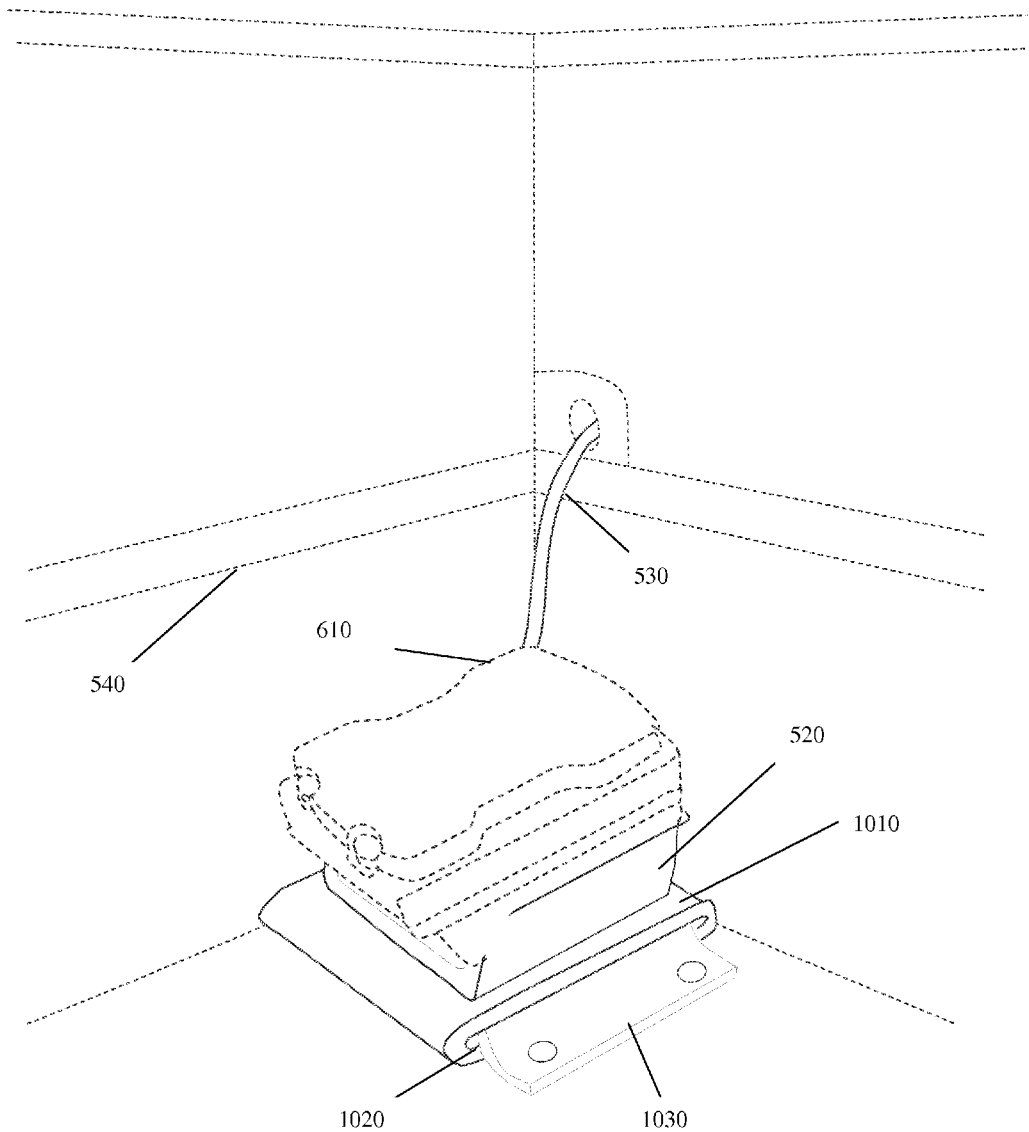
FIG. 10 illustrates a perspective view of another receptacle/adapter for a battery pack and showing an example implementation with a utility bag according to one embodiment.

FIG. 10 illustrates a perspective view of another receptacle/adapter 520 for a battery pack 610 and showing an example implementation with a utility bag 540 according to one embodiment. In one embodiment, the receptacle/adapter 520 is coupled to a mounting element 1010. In one embodiment, the mounting element 1010 forms a fully or partially closed loop where material 1030 may be fastened within a fastening channel 1020 within the mounting element 1010. In one embodiment, the receptacle/adapter 520 is mounted horizontally within the utility bag 540 (or other device). In one embodiment, a battery pack may be inserted within the receptacle/adapter 520. In one embodiment, the receptacle/adapter 520 may be mounted on a wall of the utility bag 540 (either vertically, horizontally, or angled). In one embodiment, the receptacle/adapter 520 is either permanently or removably connected to the material 1030.

In one or more embodiments, the receptacle/adapter 520 is movable to multiple connection portions of the interior portion of a utility bag 540 or other device in order to fit different sized battery packs. In one embodiment, the receptacle/adapter 520 includes multiple sized slots/grooves and multiple placed electrical connectors 205 for fitment of different battery pack sizes and or battery packs of different voltages.

In one or more embodiment, the receptacle/adapter 520 and respective components may be made of one or more of: ABS, reinforced polypropylene, polypropylene, high-density polyethylene, nylon material, hardened plastic, polymer, rubber, composite material, metal or metal alloy, etc., carbon fiber, fiberglass, or other similar or equivalent materials.

In one embodiment, the battery pack receptacle is similar to a receptacle for charging battery packs used for cordless devices or tools (e.g., cordless drills, cordless screwdrivers, cordless saws, cordless garden tools, cordless sanders, etc. In one embodiment, the receptacle/adapter 520 includes metal connectors 205 that make contact with contacts of an inserted battery pack for passing electricity from the battery pack to the receptacle/adapter 520 and through the cord 530 (add optionally to a USB connector 250, e.g., FIG. 8).

In one or more embodiments, the receptacle/adapter 520 embodiments may coupled with battery packs that may be specific to a manufacturer in order to only fit specific types of battery packs. In other embodiments, the receptacle/adapter 520 embodiments may be a universal type of receptacle to fit one or more types of battery packs. In one embodiment, receptacle/adapter 520 embodiments may hold batteries having different types of voltages, such as 12 V., 18 V., 24 V., 36 V., etc. In one embodiment, receptacle/adapter 520 embodiments include a circuit that limits voltage/amperage for different types of electronic devices, which may have different power requirements.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

In the description above, numerous specific details are set forth. However, it is understood that embodiments may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
a battery pack receptacle that removably couples to a battery pack used for a cordless device;
a universal serial bus (USB) port that is coupled to the battery pack receptacle, wherein the battery pack is used as a power source for the USB port; and
an attachment device coupled to the battery pack receptacle, the attachment device is configured for attaching the battery pack receptacle to a platform.

2. The apparatus of claim 1, wherein the battery pack receptacle is coupled to the attachment device in one of a vertical and a horizontal state.

3. The apparatus of claim 1, further comprising a USB cord coupled to a USB receptacle.

4. The apparatus of claim 1, wherein the attachment device comprises a first foot portion and a second foot portion, wherein the first foot portion and the second foot portion are configured for locking the battery pack receptacle in a sleeve of the platform.

5. The apparatus of claim 4, wherein the attachment device includes a front coupling portion and a rear coupling portion, wherein the rear coupling portion has a length greater than the front coupling portion.

6. The apparatus of claim 1, wherein the attachment device includes a front coupling portion, a rotational element and a rear coupling portion that combine to form a spring clip.

7. The apparatus of claim 1, wherein attachment device is rotatable on the attachment device.

8. The apparatus of claim 1, wherein the attachment device comprises a U-shaped attachment mounting element.

9. The apparatus of claim 1, wherein the attachment device comprises a closed loop that forms a fastening channel.

10. The apparatus of claim 1, wherein the attachment device is configured for one of removably coupling to the platform, and permanently coupling to the platform.

11. The apparatus of claim 10, wherein the platform comprises one of: a sporting bag, a fishing bag, a luggage container, a backpack, a duffle bag, a tool bag, emergency services bag, a cooler, a camping bag, a belt and a ladder.

12. An apparatus comprising:
a battery pack receptacle that removably receives a battery pack used for a cordless device;
an attachment device coupled to the battery pack receptacle that is configured for attaching the battery pack receptacle to a platform; and
one or more universal serial bus (USB) connectors coupled to the battery pack receptacle.

13. The apparatus of claim 12, wherein the battery pack receptacle transfers power from a received battery pack to the one or more USB connectors.

14. The apparatus of claim 13, further comprising a cord coupled to a first USB connector.

15. The apparatus of claim 12, wherein the battery pack receptacle is coupled to the attachment device in one of a vertical and a horizontal state, and the attachment device is one of rotatable and fixed on the attachment device.

16. The apparatus of claim 12, wherein the attachment device comprises a first foot portion and a second foot portion, wherein the first foot portion and the second foot portion are movable towards one another.

17. The apparatus of claim 12, wherein the attachment device includes a front coupling portion and a rear coupling portion, wherein the rear coupling portion has a length greater than the front coupling portion.

18. The apparatus of claim 12, wherein the attachment device includes a front coupling portion, a rotational element and a rear coupling portion that combine to form a spring clip.

19. The apparatus of claim 12, wherein the attachment device comprises a closed loop that forms a fastening channel.

20. The apparatus of claim 12, wherein the platform comprises one of: a sporting bag, a fishing bag, a luggage container, a backpack, a duffle bag, a tool bag, emergency services bag, a cooler, a camping bag, a belt and a ladder.

* * * * *